Oct. 15, 1968  R. J. LAURETI  3,405,516

YARN, CORDAGE, ROPES, AND THE LIKE

Filed Aug. 22, 1966

INVENTOR
R.J. LAURETI

BY *Young & Quigg*

ATTORNEYS

United States Patent Office 3,405,516
Patented Oct. 15, 1968

3,405,516
YARN, CORDAGE, ROPES, AND THE LIKE
Remo J. Laureti, Moorestown, N.J., assignor to Wall Industries, Inc., a corporation of Delaware
Filed Aug. 22, 1966, Ser. No. 574,039
10 Claims. (Cl. 57—144)

ABSTRACT OF THE DISCLOSURE

A strand is formed from both resinous polyester and propylene polymer which have been made mutually compatible by foaming and/or fibrillating the propylene polymer.

---

Figure 1:

This invention relates to improved yarns, cordage, ropes, and the like.

Heretofore in the making of ropes and similar materials from synthetic fibers, polyester fibers have generally been considered to be incompatible with polypropylene fibers at least in part due to the disparity in some physical properties of these two polymers.

Quite surprisingly, it has now been found that resinous polyesters and propylene polymers can be made mutually compatible for use in ropes and the like by foaming the propylene polymer fibers, i.e. forming a plurality of small bubbles throughout the entire mass of the fiber, to the extent that the resulting foamed propylene polymer fiber has an ultimate elongation substantially the same as that of the polyester fiber or fibers to be employed therewith. Also, it has been found that foamed, fibrillated polypropylene films can be used instead of separate fibers. It has also been found that unfoamed, fibrillated polypropylene films can also be employed.

By fibrillation what is meant is breaking a molecularly oriented film up in a plurality of individual fibers or into a network of fibers integrally joined to one another at random points along their length by shorter, smaller diameter cross fibers. Fibrillation can be accomplished in any known manner such as by stretching the film to orient it then compressing it between two resilient surfaces while extending them normal to the direction of orientation of the film. The film being oriented and fibrillated can be foamed or unfoamed. Full and complete disclosures of fibrillation techniques for foamed and unfoamed polypropylene films can be found in U.S. Patents 3,165,563 and 3,003,304. Foamed and oriented fiber and film can be made in accordance with the disclosure of U.S. Patent 3,214,234.

Accordingly, by this invention, cordage, rope, and the like is formed from at least one strand composed of an inner core of at least one fiber or a fibrillated film composed of a polymer of propylene and an outer sheath of at least one resinous polyester.

It has further been found that by foaming the propylene polymer fibers or by fibrillating a foamed or an unfoamed film they are not only rendered more compatible with the polyester fibers but also the resulting rope or similar article formed in accordance with this invention has a substantially increased tensile strength, substantially decreased working elongation, and substantially decreased snapback upon failure as compared to a rope formed only from conventional polypropylene fibers. Also, all sizes of the rope float and do not exhibit slip-stick characteristics when working on capstans and the like. The breaking strength (strength/weight ratio) is also increased by as much as 25 percent. The tape used in making the rope of this invention besides imparting the advantage of anti-hockling also has the advantage, especially when colored, of indicating by visual observance where severe cuts or normal wear have taken place to the extent that the rope must be replaced.

Accordingly, it is an object of this invention to provide a new and improved cordage, rope, and the like.

Other aspects, objects, and the several advantages of this invention will be apparent to those skilled in the art from the description, the drawings, and appended claims.

Figure 2:
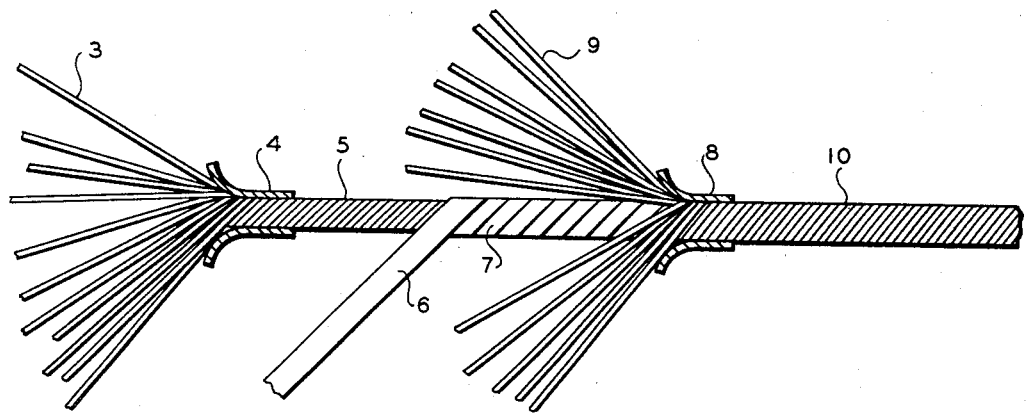
Figure 3:
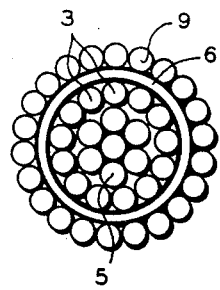
Figure 4:
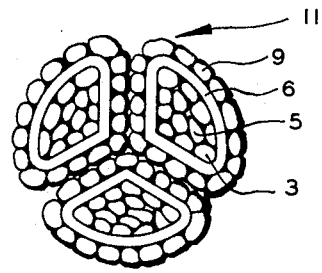

FIGURE 1 shows a strand embodying this invention.
FIGURE 2 shows another strand embodying this invention.
FIGURE 3 shows a transverse cross section of the strand of FIGURE 2.
FIGURE 4 shows a transverse cross section of three strands of FIGURE 2 when laid into a rope.

In FIGURE 1 there is shown a strand formed according to this invention. More specifically, there is shown a plurality of core fibers of propylene polymer 1 around which is wrapped a plurality of resinous polyester fibers 2 to form a sheath over the core. In lieu of fibers, the outer sheath can be formed of a continuous or discontinuous tube or the like of polyester coating the inner core.

FIGURE 2 shows another strand formed according to this invention and a procedure for forming that strand. As is conventional, the component propylene polymer core fibers or yarns 3 are fed from supplies through guides (not shown) and are compacted by guide or forming tube 4 having a flaring receiving end, twisting being effected by the rotation about that longitudinal axis of the strand of rotating capstans and receiving reel. The component yarns or fibers which enter guide 4 are twisted therein. The guiding is carried out in a conventional manner to produce concentric layering, the number of layers involved depending on the size and desired structural composition of the rope. Emerging from guide 4 is the layered portion 5 of the strand without its ultimate outer layer of polyester fibers and/or yarns.

Beyond the end of guide 4 a tape 6 is fed from a supply reel (not shown) and guided at a suitable angle through a conventional guide means (not shown) to be wrapped around layered portion 5 of the strand. The tape is fed at an angle so that, considering its width, its adjacent convolutions produced about the strand portion 5 and indicated at 7 overlap slightly, though as an alternative tape can be wound about portion 5 with the convolutions not overlapping sufficiently close together to satisfactorily confine portion 5.

Tape 6 is a confining element and by being tightly wound, for example, by way of application of a brake to the supply reel of the tape, it will exercise its confining action even without the exertion of a large tension thereon. Thus, the tape can be of substantially any material even those having relatively low strengths. For example, the tape can be of a thin, loosely woven fabric of any desired textile material though for good resistance against deterioration by moisture it is desirably woven of synthetic fibers such as nylon, polyethylene, polypropylene, and the like. Alternatively, it can be formed of a braided material of the same type of composition. The tape can also be formed as a flattened tube of a circularly knit material such as nylon and the like and, if this type of tape is used, the knitting can be relatively loose with large loops so that a minimum weight of material is used for a given length of rope. Further, the tape can be formed as an open work extruded net such as a fibrillated film of a plastic material such as polyethylene and polypropylene. The tape can also be provided by running in parallel, unconnected yarns to form multiple helices about the strand portion 5. In the later case the feed is desirable at a different angle than that of the twist of the outer layer of the strand portion 5 so that its helix angle is different than that of the layer. The tape can be colored, e.g. red, to indicate visually to the user when it should be replaced because the outer fibers of the rope have been worn away down to the tape.

Optionally, an adhesive can be applied to the tape to keep its adjacent convolutions in a definite fixed relationship to each other and thereby avoid any possibility of shifted positions which might expose portions of the outer layer of strand portion 5. Preferred adhesives are the pressure sensitive types having permanent tackiness such as those used for medical bandages. It is also advantageous to use a tape having an adhesive on both faces so as to bind to the barrier tape both the inside and outside yarns or fibers.

The wrapped portion 5 then feeds through a second guide 8 which also receives polyester yarns and/or fibers 9 of the outermost layer of the strand, this layer being indicated at 10. The finished strand which is then reeled up presents an external appearance and configuration corresponding to that of a conventional strand.

FIGURE 3 shows a transverse cross section through an area of the finished strand of FIGURE 2 thereby showing strand portion 5 composed of component yarns or fibers 3 wrapped in tape 6 and outer polyester fibers or yarns 9.

Three strands such as that shown in FIGURE 3 can be laid in a conventional manner well known in the art to form a rope noted in FIGURE 4 by 11. It will be obvious that variations can be involved using conventional techniques to provide other types of cordage, ropes, cables, and the like using two or more strands of FIGURES 1 or 2.

Generally, any known and commercially available propylene polymer can be employed in this invention. Although homopolymers of propylene are preferred, copolymers of propylene with other 1-olefins containing from 2 to 8 carbon atoms per molecule can be employed so long as the copolymer maintains properties substantially similar to that of a homopolymer of propylene. Generally, the copolymers of propylene and one or more 1-olefins will contain at least 75 weight percent propylene based on the total weight of the copolymer. The homopolymers and copolymers can have a density in grams per cubic centimeter at 25° C. of no less than 0.85, preferably 0.90. The propylene polymers of this invention can be made in any conventional manner, a particularly preferred method being that disclosed in U.S. 2,825,721, the disclosure of which is incorporated herein by reference.

Examples of 1-olefins include ethylene, butene-1, hexene-1, octene-1, and the like.

The propylene polymer fibers or film for subsequent fibrillation can be foamed in any conventional manner known in the art. A particularly preferred method is that disclosed in U.S. Patent 3,214,234, the disclosure of which is incorporated herein by reference, which discloses the incorporation of foaming agents in the polymer to be foamed and thereafter extruding and foaming said polymer. Generally, the foaming of the fibers or film to be fibrillated should be substantially uniform throughout the cross section and length of the fiber and characterized by a plurality of substantially uniform size, spaced-apart bubbles. Some of the bubbles can, however, be interconnected and extend alone or together with other interconnected bubbles to one or more surfaces of the fibers. The degree of foaming of the fibers or film will vary widely depending upon the ultimate elongation property of the resinous polyester to be employed therewith. Generally, however, the foamed propylene polymer fibers will have a volume to weight ratio at least 1.1 times that of the unfoamed fiber. Also, these foamed fibers will have a density no greater than 0.8 grams per cubic centimeter at 25° C. using a draw ratio in the range of 7:1 to 9:1 in forming the fiber.

The size of the propylene polymer fibers as well as the polyester fibers can vary widely depending upon the application, i.e. cordage, rope, and the like. Generally, fibers of both polymers can be monofilaments of diameters of from about 4 to about 20 mils, and/or multifilaments of diameters of from about ½ to about 1 mil. Combinations of monofilaments and multifilaments can be employed as well as monofilaments per se and multifilaments per se, the use of multi- and/or monofilaments being applicable to each polymer present in the final product. The film to be fibrillated, be it foamed or unfoamed, will generally have a thickness of from about ½ to about 20 mils, preferably about ½ to about 4 mils.

The polyester employed in this invention can be any known resinous polyester capable of being made into monofilaments and/or multifilaments. By resinous polyesters what is meant is high molecular weight condensation products resulting from the esterification of one or more polybasic acids by one or more polyhydric alcohols. The formation of these polymers is well known and is discosed in Chapters 41 and 42 and related chapters in "The Chemistry of Synthetic Resins" by Carleton Ellis, Reinhold Publishing Corporation, N.Y., 1935, the disclosure of which is incorporated herein by reference. Although generally any polybasic organic acid can be employed, preferred are paraffinic, cycloparaffinic, aromatic, ether, and dibasic acids containing from 2 to 15 carbon atoms per molecule.

Examples of such acids include oxalic, succinic, tartaric, fumaric, citric, adipic, suberic, sebacic, diglycolic, dilactic, dihydracrylic, salicylacetic, benzophenone-2,4'-dicarboxylic, phthalic, isophthalic, terphthalic, diphenic, 1,8-naphthalic, camphoric, tetrahydrophthalic acid, 3,6-endomethylene-$\Delta$-tetrahydrophthalic acid and the like.

Also, generally any polyhydric alcohol can be employed, preferred alcohols containing from 2 to 6 hydroxy groups and from 2 to 10 carbon atoms per molecule. Examples of such alcohols include glycol, polyglycols such as diethylene glycol, tetraethylene glycol, heptaethylene glycol, and decaethylene glycol, glycerol, polyglycerols similar in nature to the polyglycols above-mentioned, propane-1,2-diol, trimethylene glycol, isobutane glycol, butane-2,3-diol, pentamethylene glycol, octamethylene glycol, pentaerythritol, sorbitol, mannitol, hexahydroxycyclohexane, cyclohexanedimethanol, and the like.

The polyesters can be formed into mono- or multifilaments in any conventional manner as with the propylene polymers which includes melt extrusion, and the like. Commercially available polyester fibers can be used.

The yarns of this invention can be formed conventionally simply by wrapping one or more polyester fibers around one or more propylene polymer fibers. The yarns can then be formed with one another or with one or more other yarns formed from other materials, natural or synthetic, in any conventional manner to form cordage, ropes, and the like. A method for forming cordage and ropes is disclosed in U.S. Patent 3,145,525, the disclosure of which is hereby incorporated herein by reference.

Also, if desired, polyethylene filaments can be blended with the polyester outer yarns to serve as a permanent lubricant.

EXAMPLE

A rope having an appearance substantially the same as FIGURE 4, about 2 inches in diameter, having a rope pitch of about 5.9 inches, and a strand pitch of about 6 inches is formed from three strands having substantially the same appearance as FIGURES 2 and 3. Each strand is composed of a twisted core of a plurality of separate yarns of a homopolymer of propylene around which is overwrapped, in the same direction, a red woven non-load bearing tape composed of cotton and adhesive, to form a sheath thereon to prevent hockling. Over this is wrapped, in the same direction, a plurality of yarns of polyethylene terephthalate. The polypropylene fibers are foamed throughout substantially their whole mass and have a density in grams per cubic centimeter at 25° C. of less than 0.8 based on an 8 to 1 draw ratio. Approximately 42 weight percent of the rope is formed from the foamed polypropylene fibers, the remainder of the rope being formed from the polyester fibers.

The polyester fibers have ultimate elongations in the range of 9 to 11 percent and the polypropylene fibers have ultimate elongations in the range of 9 to 12 percent.

The rope is substantially unaffected by moisture, the foamed polypropylene filaments are protected from heat by the polyester sheath and, therefore, the rope exhibits a substantially increased tensile strength on the order of 25 percent, substantially less working elongation and the consequent reduction of hazards connected with snap-back if failure of the rope occurs. Also, the rope is highly economical due to its lower weight per unit length. Further, the rope does not exhibit adverse bind and slip, i.e. "stick-slip," characteristics normally attributed to polypropylene ropes used to render or check ships during docking, towing, and the like.

Reasonable variations and modifications are possible within the scope of this disclosure without departing from the spirit and scope thereof.

I claim:

1. A strand composed of an inner core formed from foamed fibers, foamed, fibrillated films, fibrillated films or mixtures thereof all formed from a polymer of propylene and an outer sheath of at least one resinous polyester, the foamed fibers and film having been foamed to the extent that its ultimate elongation is substantially the same as the ultimate elongation of its polyester sheath and the fibrillated film having been fibrillated to the extent that its ultimate elongation is substantially the same as the ultimate elongation of its polyester sheath.

2. Cordage composed of a plurality of strands of claim 1.

3. The strand according to claim 1 wherein a confining tape encloses the inner core in between the inner core and the outer sheath.

4. Cordage composed of a plurality of strands of claim 3.

5. The strand according to claim 1 wherein said foamed fiber is in the form of monofilaments, multifilaments, or mixtures thereof, said foamed fiber, foamed, fibrillated film, fibrillated film or mixtures thereof are all composed of a polymer selected from the group consisting of homopolymers of propylene, copolymers of propylene with at least one mono-1-olefin containing from 2 to 8 carbon atoms per molecule or mixtures thereof, said foamed materials containing a plurality of internal, substantially uniform sized bubbles, some of which are interconnected and some of which extend to at least one external surface.

6. The strand according to claim 5 wherein the propylene polymer has a density no greater than 0.8 grams per cubic centimeter at 25° C. having been drawn in a draw ratio range of 7:1 to 9:1 in forming said fibers, and wherein said polyester is present in the form of at least one of monofilaments and multifilaments wrapped about said inner core, and the propylene polymers have a volume to weight ratio of at least 1.1 times that of the unfoamed filaments.

7. cordage composed of a plurality of strands of claim 6 laid about one another each strand having a tubular helically wound fabric member wound about the inner core between the inner core and the outer sheath and the outer polyester yarns have polyethylene filaments blended therewith.

8. The strand according to claim 1 wherein said polyester is formed from a polyhydric alcohol having from 2 to 10 carbon atoms per molecule or mixtures thereof, and a polybasic acid having from 2 to 15 carbon atoms per molecule or mixtures thereof.

9. The strand according to claim 6 wherein said polyester monofilaments have a diameter in the range of from about 4 to about 20 mils and the polyester multifilaments have a diameter in the range of from about ½ to about 1 mil.

10. The strand according to claim 1 formed from foamed fiber which is composed of a homopolymer of propylene and a resinous polyester which is in the form of a filament composed of polyethylene terephthalate, the foamed fiber having an ultimate elongation in the range of from about 9 to about 12 percent and the polyester filament having an ultimate elongation in the range of from about 9 to about 11 percent.

References Cited

UNITED STATES PATENTS

| | | | |
|---|---|---|---|
| 2,022,683 | 12/1935 | MacKinnon et al. | 57—144 |
| 3,003,304 | 10/1961 | Rasmussen | 28—1.4 XR |
| 2,920,349 | 1/1960 | White et al. | 28—1 XR |
| 3,026,669 | 3/1962 | Stanton | 57—144 XR |
| 3,055,167 | 9/1962 | Gaston | 57—144 |
| 3,165,563 | 1/1965 | Rasmussen | 28—1.4 XR |
| 3,201,930 | 8/1965 | Stirling | 57—140 XR |
| 3,214,234 | 10/1965 | Bottomley | 8—55 |
| 3,214,899 | 11/1965 | Winninger et al. | 57—140 |
| 3,315,455 | 4/1967 | Stoller | 57—144 |
| 3,323,301 | 6/1967 | Jackson | 57—144 |

FOREIGN PATENTS

| | | |
|---|---|---|
| 891,618 | 3/1962 | Great Britain. |

STANLEY N. GILREATH, *Primary Examiner.*

WERNER H. SCHROEDER, *Assistant Examiner.*